July 3, 1951

H. J. HERSEY, JR 2,559,428

DUST FILTER

Filed June 21, 1949

INVENTOR
H.J. HERSEY, JR.
BY
James D. Bock
ATTORNEY

July 3, 1951 — H. J. HERSEY, JR — 2,559,428
DUST FILTER
Filed June 21, 1949 — 2 Sheets-Sheet 2
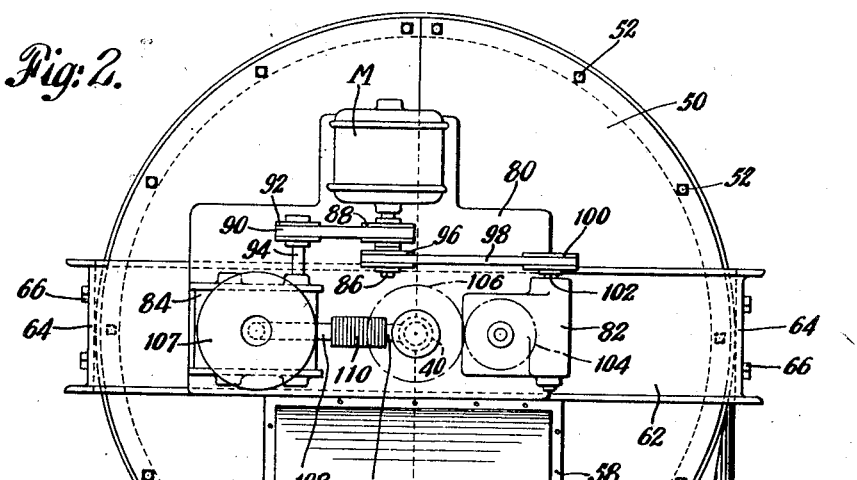
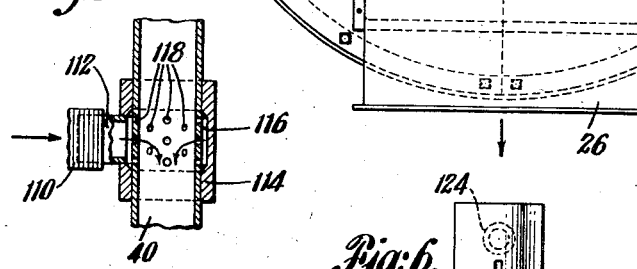
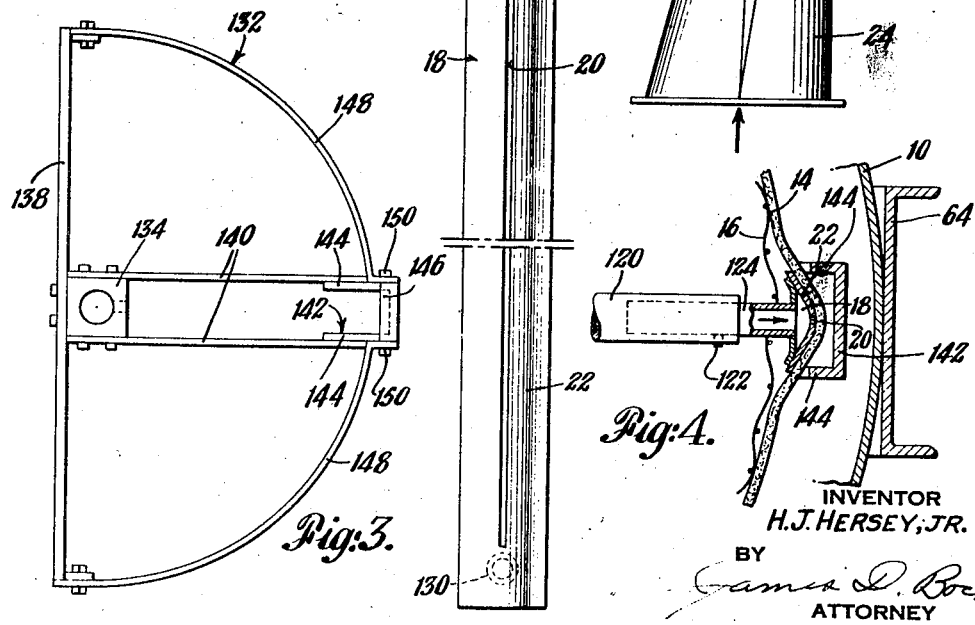
INVENTOR
H. J. HERSEY, JR.
BY
ATTORNEY Patented July 3, 1951

2,559,428

UNITED STATES PATENT OFFICE 2,559,428

DUST FILTER

Henry J. Hersey, Jr., Chatham, N. J.

Application June 21, 1949, Serial No. 100,324

11 Claims. (Cl. 183—61)

The present invention relates to dust filters of the type wherein dust-laden air or other gas is caused to flow through a porous filter medium as a result of a differential in gaseous pressure on opposite sides of the filter medium. The particles contained in the dust-laden gas accumulate on the high pressure side and, depending upon the nature of the equipment and of the particles contained in the dust, the porosity of the filter medium is gradually reduced and the filtering efficiency drops to such an extent that it is necessary to clean the filter medium. The present invention relates particularly to a filter of the general type described, in which provision is made for cleaning the filter medium, without interruption of the operation of the filter, by means of a jet of air or other gas directed through the filter medium in a direction opposite to the flow of the gas being filtered. This dislodges the accumulated particles from the high pressure side of the filter medium in a zone immediately adjacent this reversely directed jet. Preferably the jet of cleaning gas is supplied through a restricted orifice or nozzle carried by what may be called a blow-tube. Preferably means is provided for producing relative motion between the blow-tube and the filter medium so that the entire surface of the filter medium may be subjected to the cleaning operation.

The particles dislodged by the cleaning operation are projected into the incoming dust-laden gas and in the devices heretofore known, a certain portion of the particles will become suspended in that gas only to be redeposited upon the filter medium. To the extent that this occurs, the filtering operation is less efficient than it should be.

It is a particular object of the present invention to provide a filter of the general type described, having means for cleaning the filter medium by reverse jet operation in which substantially all of the particles dislodged in the cleaning operation are dislodged into a zone of the filter which is substantially free from the turbulence normally associated with the incoming dust-laden gas. This zone is so arranged with respect to the blow-tube that the particles dislodged by the blow-tube may gravitate to a position for ultimate disposal. In this manner there is very little tendency for any portion of the dislodged particles to redeposit upon the filter medium.

One of the features of the present invention is the provision of a receiver positioned on the high-pressure side of the filter medium and so arranged with regard to the cleaning nozzle or blow-tube as constantly to be disposed adjacent the area of the filter medium upon which the cleaning nozzle is working at any given moment. In general the receiver is so shaped as to correspond with the shape of the cleaning nozzle and to lie quite close to the high-pressure surface of the filter medium. It is so disposed that the material dislodged from the filter medium by the blast from the cleaning nozzle will be propelled into the receiver. The receiver, furthermore, is preferably so shaped that it will guide the particles and permit them to gravitate within the receiver to a hopper or similar accumulator at the bottom of the filtering device. The receiver, therefore, defines a zone which is relatively free of the normal movement of the dust-laden gas toward the filter medium and the tendency of the dust-laden gas to rush toward the freshly cleaned surface carrying the dislodged particles with it, will be very greatly reduced.

Another feature of the present invention is its provision for the use of fragile filter mediums which require a foraminous support or reinforcing structure on the low-pressure side to enable it to support the load of accumulated particles and to enable it to withstand the differential in gaseous pressure existing between the high-pressure and low-pressure sides. For example, filter mediums such as very thin felt or paper or paper-like material may be reinforced by a screen or lattice work so that very large areas thereof may be exposed to dust-laden gas. The present invention provides a structure wherein enormous areas of fragile filter medium supported by suitable reinforcing structures may be used and subjected to a continuous and effective reverse jet cleaning operation. Heretofore reverse jet cleaning of efficient type has been available only in connection with strong filter mediums.

In the present invention the cleaning nozzle is made long and thin and is positioned between the reinforcing structure and the filter medium. The pressure of the dust-laden gas will cause the filter material to press closely against the reinforcing structure and to bend around the cleaning nozzle, elongating the outer surface thereof. Appropriate mechanical means may be provided for causing relative movement between the filter medium and the cleaning nozzle while the latter remains between the reinforcing element and the filter medium.

It is an object of the present invention, therefore, to provide a filtering device of the type in which a porous and flexible filter medium in the nature of felt, cloth, paper or the like may be used, and in which a very highly efficient cleaning operation is performed to greatly enhance the capacity of the filter.

It is a further object of the present invention to provide a filtering device in which very large areas of a fragile filter medium may be supported by reinforcing means and at the same time be so arranged as to be effectively cleaned to maintain a high capacity.

Other and further objects of the present invention will in part be obvious and will in part become apparent from a consideration of the following detailed description of a preferred, but not necessarily the only, form of the invention taken in connection with the drawings accompanying and forming a part of this specification.

In the drawings:

Fig. 2 is a top plan view of the apparatus shown in Fig. 1;

Fig. 3 is a plan view of the lower support for the receiver;

Fig. 4 is a fragmentary horizontal section taken along the line 4—4 of Fig. 1 and showing the relation of the cleaning nozzle, the receiver and the reinforcing structure for the filter medium;

Fig. 5 is a vertical sectional view showing the details of the coupling through which cleaning air is conducted to the nozzle-supporting structure; and Fig. 6 is an elevational view of the cleaning nozzle.

Figure 1:
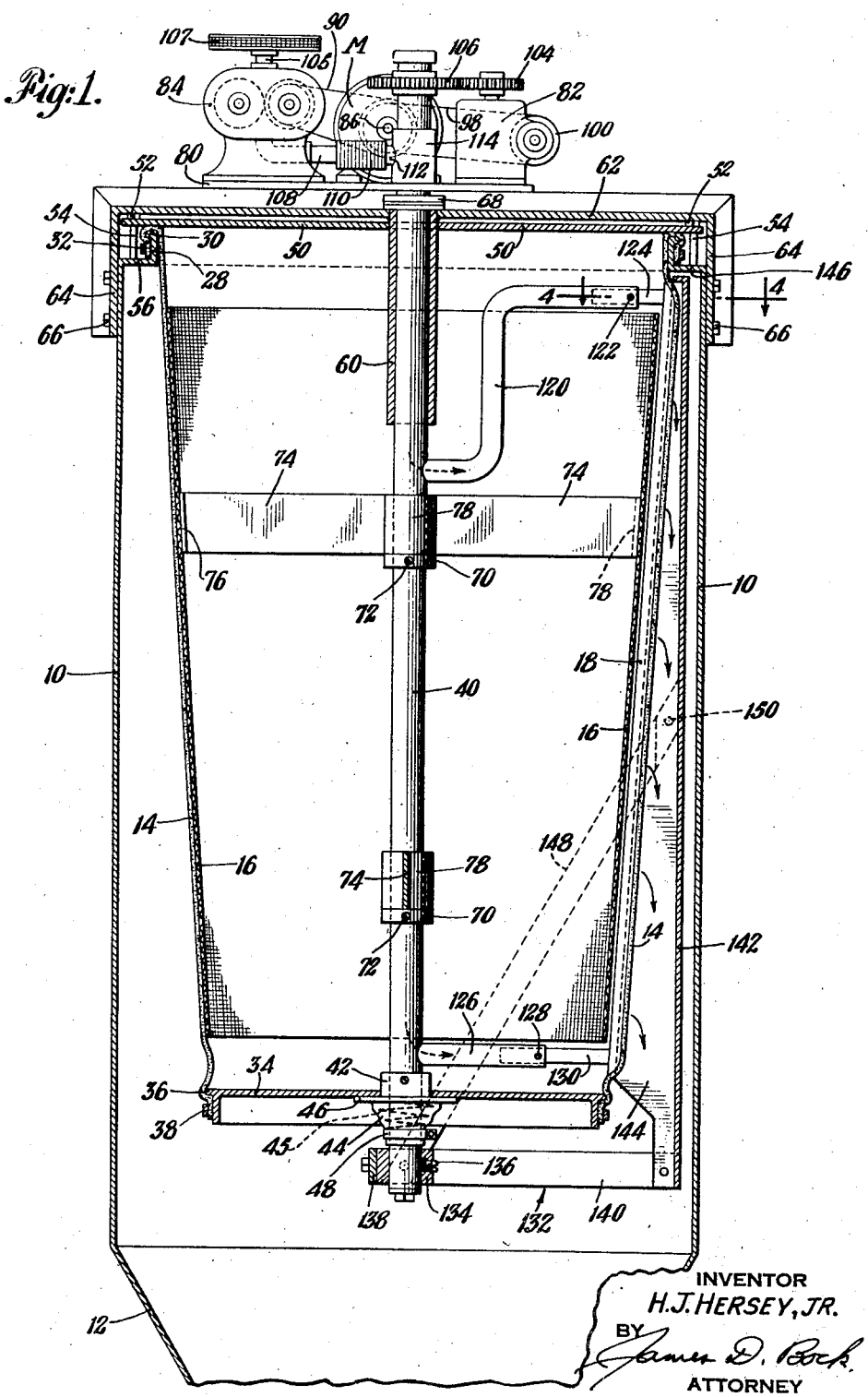
Fig. 1 is a vertical sectional view of a dust filter embodying the present invention, with certain parts thereof not in section for the purpose of clarity of illustration.

Referring now to the drawings, a dust filter embodying the features of the present invention is shown as comprising a generally cylindrical body 10 defining a chamber having a tapered lower section 12 which communicates with a hopper (not shown) for receiving the particles which have been separated from a gas in the operation of the filter. The filter mechanism is enclosed within the cylindrical body 10 and comprises a tube 14 made of any suitable porous filter medium. Preferably the material from which filter 14 is made is a felted material such as felt or paper, although certain of the features of the present invention will be found to be of value when used in connection with filtering mediums of various materials. The tubular filter medium 14 is so mounted in the chamber 10, 12 as to define a sub-chamber of generally cylindrical conformation.

For purposes of illustration of the present invention, it may be assumed that the filter medium 14 is made of felt and is sufficiently fragile to need the support of some form of perforated reinforcing means. Thus there is shown a reinforcing frame 16 which may be made of wire screen of a mesh-size suitable for the particular filter medium used. From a consideration of Figs. 1 and 4 it will be observed that the filter medium 14 is of greater diameter in any given horizontal plane than the reinforcing frame 16. The difference in diameter is just sufficient to permit the positioning between the reinforcing frame and the filter medium 14 of an elongated cleaning nozzle or blow-tube 18 provided with an elongated orifice 20 positioned in the apex of a triangular front wall 22 of the blow-tube 18. The shape of the front wall 22 of the blow-tube 18 is such that the filter medium may be smoothly curved when pressed thereagainst by the gaseous pressure on the high-pressure side. The portion of the filter medium immediately opposite the orifice 20 at any given time will be rather sharply bent as indicated in Fig. 4. The elongation of the outer surface of the filter medium serves to open the interstices thereof and to facilitate the dislodgment of the accumulated particles as will be more fully explained hereinbelow.

The dust-laden gas or air is introduced to the filter through an inlet 24 which preferably is connected with the cylindrical body 10 at the upper end thereof in such manner that the gas will enter tangentially and circulate around and downwardly of the interior of the chamber outside the filter medium. The dust-laden gas may be supplied under pressure or may be drawn through the filter by fans on the discharge side. In either event, the interior surface of the filter medium is under a lower pressure than the exterior thereof and the gas which carries the dust will flow through the filter medium, leaving the particles deposited on the high-pressure surface thereof. The cleaned gas will flow into the sub-chamber defined by the filter medium and upwardly to an outlet 26.

As shown in Fig. 1, the filter medium 14 is supported at the top upon an annular ring 28 carried by the body 10. Desirably the annular ring 28 is formed with a bead 30 over which the upper edge of the tubular filtering medium 14 may be bent outwardly and downwardly. The upper edge of the filter medium may be secured to the ring 28 by a band 32 which may be made of contractile material or may be provided with a turnbuckle or other suitable device whereby it may be contracted upon such upper edge.

It will be observed that the reinforcing frame 16 and the filter medium 14 are generally cylindrical in shape and that the blow-tube 18 and slot 20 coincide generally with an element of the cylinder. A self-supporting filter medium could be truly cylindrical or have any other generally tubular shape, but in the case of filter mediums which require support by a reinforcing frame 16 as disclosed herein, it has been found highly advantageous to taper the filter medium and the reinforcing frame. As shown in the drawings, the filter medium 14 and reinforcing frame 16 are frusto-conical with the lower ends of somewhat smaller diameter than the upper ends thereof. This provides for accurate adjustment of the tubular filter medium 14 in telescopic relation upon the reinforcing frame to leave just enough slack for movement of the blow-tube 18 therebetween. Obviously, the filter medium 14 should not be so slack upon the reinforcing frame that wrinkles or pleats may occur because wrinkled or pleated areas will not be effective for filtering purposes. Similarly, the relationship should not be so tight that undue friction is set up between the filter medium and the blow-tube 18 during the course of movement of the blow-tube around the central axis of the filter.

The filter medium 14 may be made of the desired shape by cutting the material from a flat sheet and tapering one or both of the ends by joining these ends in any suitable manner as by stitching. The tapering tubular body of filter medium 14 may thus be drawn upwardly over the reinforcing frame and blow-tube 18 to the desired extent and the upper edge may be secured to the annular ring 28 as above described.

At its lower end the body of filter medium 14 is attached to a disc 34 which is provided with a lip 36 and a band 38 which operate in the same manner as the lip 30 and band 32 just described. The disc 34 is imperforate except at its center where it receives a vertically disposed hollow shaft 40. The shaft 40 is received in a bearing 42 in the disc 34.

A flexible boot 44 is provided for sealing the bearing and the lower end of the hollow shaft 40. The boot 44 is made of rubber or rubberized fabric and is generally conical in shape. A sharply tapering helical spring 45 is positioned within the boot. The narrow end of the boot 44 is clamped to the exterior of the shaft 40 by a conventional clamping ring 48. A flange 46 is secured to the wide end of the boot 44 and is pressed into contact with the disc 34 by the expansive action of the enclosed spring 45. When the filter is in operation the pressure of the dust-laden air will be effective to press the flange 46 more tightly against the disc 34. In this manner the dust-laden air in the chamber exterior of the filter medium is excluded from entering the sub-chamber interior thereof through the bearing 42. Inasmuch as the entire lower end of the filter medium 14 is tightly closed by the disc and the sealed bearing therein, the clean gas which passes through the filter medium must flow upwardly for discharge through the outlet 26 as heretofore described.

At its upper end the filter is closed by a cover plate 50 which may be held down by a plurality of nuts 52 threadably received upon studs 54 secured to an inwardly-turned flange 56 of the body 10 of the filter. The cover plate as shown in Fig. 1 rests upon the portion of the filter medium turned over the annular ring 28 and thus effectively seals the filter.

The cover plate 50 is provided with a suitable opening for communication with the outlet 26. The outlet 26 may comprise an elbow secured to the cover plate by a flange 58, if so desired.

Cover plate 50 is also provided with an opening for receiving an elongated sleeve-like bearing 60 which surrounds the hollow shaft 40. The bearing 60 is supported by an overhead framework which desirably may be formed from a horizontally extending channel 62 having extensions 64 at the opposite ends thereof in such position as to be secured to the body 10 of the filter by cap screws 66 or the like. The overhead frame just described serves to support the driving mechanism and other accessory equipment for the operation of the filter, as will be more fully described hereinbelow.

The hollow shaft 40 is provided with a suitable thrust bearing 68 which rests upon the overhead frame member 62. The bearing 68 and the elongated bearing 60 therefore provide adequate support for the hollow shaft 40 in vertical and horizontal directions. The construction just described is desirable inasmuch as the lower end of the hollow shaft 40 is free.

The foraminous support or reinforcing frame 16 is supported by the hollow shaft 40 through collars 70 which are secured to the shaft 40 by set screws 72. To this end the frame 16 is provided with spoke-like arms 74 which are welded or otherwise permanently secured thereto at their outer ends. As shown in the drawings, the arms 74 are provided at their outer ends with oppositely-turned flanges 76 and 78 to provide adequate area for welding or otherwise securing the same to the frame 16. The arms 74 are secured to hubs 78 which rest upon the set screw collars 70 and which are freely rotatable with relation to the shaft 40.

Since the filter medium 14 is secured to the outer body 10 of the filter, it will serve to hold the reinforcing frame 16 against rotation with the hollow shaft 40.

The overhead frame member 62 has secured thereto a base plate 80 upon which is mounted a suitable motor M, a speed reducer 82, and a blower 84. The blower 84 preferably is of the rotary positive pressure type while the speed reducer 82 may be of any suitable type capable of imparting rotation to the shaft 40 at a speed of a few revolutions per minute.

As shown in the drawings, the shaft 86 of motor M carries two pulleys. A pulley 88 is connected by a belt 90 to a pulley 92 on the shaft 94 of the blower 84. A pulley 96 on the motor shaft is connected by a belt 98 to a pulley 100 on the shaft 102 of the speed reducer 82.

The speed reducer 82 may drive the hollow shaft 40 through a gear 104 and a gear 106 fixed to the hollow shaft 40.

The air intake of the rotary blower 84 is indicated at 105 and it is preferably fitted with an air cleaner 107. The air outlet of the blower 84 is indicated at 108. A flexible coupling 110 such as a rubber hose is connected between the outlet 108 and an inlet 112 (Fig. 5) formed in a hollow hub 114 surrounding the hollow shaft 40. The hub 114 has a recess 116 therein which is in communication with the inlet 112, and the hollow shaft 40 may be provided with a plurality of openings 118 communicating with the recess 116 whereby air supplied under pressure from the blower 84 is admitted to the interior of the hollow shaft 40. The hollow shaft 40 is made airtight at the top and bottom by the use of suitable plugs or caps.

The hollow shaft 40 has secured thereto a tubular arm 120, the interior of which is in communication with the interior of the shaft 40. At its outer end the arm 120 is provided with a set screw 122 for adjustably securing an inlet tube 124 in closely-fitting telescopic relation with the tubular arm 120 for a purpose to be described. Toward its lower end the hollow shaft 40 is provided with a second tubular arm 126 the interior of which is in communication with the interior of the hollow shaft 40. At its outer end the arm 126 carries a set screw 128 for adjustably securing a hollow inlet tube 130 in closely fitting telescopic relation with the arm 126 for a purpose to be described.

Referring now to Figs. 5 and 6, it will be observed that the tubes 124 and 130 are located at the upper and lower ends, respectively, of the blow-tube 18. They are in communication with the interior of the blow-tube whereby air supplied under pressure by the blower 84 is conducted to the blow-tube at both its upper and lower ends. This insures an adequate supply of air for discharge through the orifice 20.

As described above, the blow-tube 18 lies between the reinforcing frame 16 and the filter medium 14. Rotation of the hollow shaft 40 is imparted through the tubular arms 120 and 126 to the blow-tube whereby the blow-tube is progressively moved around the filter for cleaning of the entire surface thereof. Depending upon the nature of the particular filter medium in use and upon the closeness of fit of the tubular body of the filter medium 14 upon the reinforcing frame 16, the exact positioning of the blow-tube 18 may have to be adjusted. The set screws 122 and 128 are provided so that such adjustment may be made rapidly and conveniently.

At its lower end and beyond the bottom disc 34 the hollow shaft 40 carries a generally semi-circular frame 132. The frame 132 is secured to the shaft 40 through a hub 134 and set screws 136. The frame 132 comprises a cross member 138 secured to the hub 134 and to spaced arms 140 also secured to the hub 134.

At their outer ends the arms 140 carry a vertically disposed channel-shaped receiver 142 having inwardly directed flanges 144 which are spaced from one another a distance about equal to and preferably greater than the width of the blow-tube 18. The flanges 144 extend toward the filter medium almost into contact therewith along vertical lines disposed on either side of the blow-tube. This relationship is clearly shown in Fig. 4, for example. When the filter medium 14 and reinforcing frame 16 are tapered as shown in the drawing, the receiver 142 is tapered in such manner that the flanges 144 become progressively shorter toward the upper end of the receiver and thus conform to the shape of the filter medium.

At its upper end the receptacle 142 is provided with a horizontally disposed inwardly turned flange 146 which serves substantially to close the upper end of the receptacle by extending inwardly almost into contact with the surface of the filter medium 14 in the position to which it is displaced by the blow-tube 18. At its lower end the receptacle 142 is open so that the solids dislodged from the surface of the filter medium 14 by the blow-tube 18 may gravitate directly to the lower portion 12 of the filter for accumulation with such solids as may fall from the outer chamber and from the remainder of the surface of the filter medium in the normal course of operation.

For purposes of stability the receptacle 142 may be braced by means of angularly-disposed curved braces 148 which extend from the opposite ends of the cross arm 138 exteriorly of the filter medium 14. The braces 148 may be secured at suitable points along the length of the receptacle 142 as by cap screws 150.

The construction first described provides for simultaneous movement of the blow-tube 18 and receiver 142 relative to the filter medium 14 whereby the solids dislodged from the filter medium by the blow-tube 18 will always be propelled into the receiver. The walls 144 and top flange 146 serve substantially to isolate the interior of the receiver from the currents of dust-laden gas circulating within the chamber defined by body 10 and therefore the solids are left almost entirely free of any tendency to re-deposit upon the freshly cleaned portion of the filter medium 14. The solids are discharged by gravity from the lower end of the receiver 142 into a zone which is almost entirely free of currents which might tend to carry them upwardly toward the filter medium. Thus the present invention provides a filter in which a very large portion of the solids dislodged by cleaning are directly conducted to the accumulating zone or hopper and in which there is no secondary problem of gas and solids separation such as is presented by all of the reverse jet cleaning devices of the prior art with which I am familiar.

The principles of the present invention are clearly adaptable to dust filters of differing specific structure. For example, the positioning of the intake zone of the filter well above the zone within which the receiver discharges the solids dislodged by reverse jet cleaning apparatus presents the very great advantage that the dislodged solids do not become mixed with the incoming dust-laden gas irrespective of the particular shape or type of filter medium or blow-tube used.

Similarly, the positioning of the blow-tube between the filter medium and the foraminous support therefor makes it possible to achieve the benefits of reverse jet cleaning in which the blow-tube is in direct contact with the filter medium and in which the filter medium is bent around the blow-tube to open the interstices thereof in conjunction with fragile filter mediums of any shape or type with which a foraminous support must be used.

In the preferred form of filter chosen for illustration, the filter medium 14 defines a sub-chamber into which the cleaned gas flows for discharge through the outlet 26. In certain forms of filters to which portions, at least, of the present invention may be adapted where the dust-laden gas is supplied under super-atmospheric pressure, the cleaned gas may be allowed to escape directly from the surface of the filter medium to the atmosphere. In such event the side of the filter medium exposed to the atmosphere will be the low pressure side and the blow-tube 18 will be located on that side whether that side be the interior or exterior side of a generally cylindrical filter medium or merely one side of a filter medium of flat or other shape.

The detailed description herein given of a preferred form of my invention is to be taken in an illustrative rather than in a limiting sense and the scope of the invention is to be limited only by the appended claims.

What is claimed is:

1. A dust filter comprising a chamber having generally vertically disposed walls and a portion near the bottom thereof for collecting dust particles which gravitate to said portion, a porous filter medium suspended within said chamber and forming a generally vertically disposed wall defining a sub-chamber communicating with said chamber only through said porous filter medium, means for directing dust-laden gas to said chamber under gaseous pressure greater than that existing in said subchamber to cause said gas to pass through said filter medium and to deposit a layer of the solids forming said dust on the high pressure surface of said filter medium, means for cleaning said filter medium comprising a hollow member having a wall engaging the low pressure side of said filter medium and having an orifice formed in said wall, means for supplying air at a gaseous pressure substantially higher than that existing in said chamber for discharge through said orifice and through said filter medium to dislodge a portion of said layer of solids in a zone opposite said orifice, and a receiver located within said chamber in close proximity with that portion of the high pressure side of said filter medium from which said solids are dislodged, said receiver being open at the bottom whereby the particles dislodged from said filter medium and propelled into said receiver may gravitate within said receiver for discharge from the bottom thereof into the dust-collecting portion of said chamber.

2. A dust filter comprising a chamber having generally vertically disposed walls and a portion near the bottom thereof for collecting dust particles which gravitate to said portion, a porous filter medium suspended within said chamber and forming a generally vertically disposed wall defining a sub-chamber communicating with said chamber only through said porous filter medium, means for directing dust-laden gas to said chamber under gaseous pressure greater than that existing in said sub-chamber to cause said gas to pass through said filter medium and to deposit a layer of the solids forming said dust on the high pressure surface of said filter medium, means for cleaning said filter medium comprising a hollow member having a wall engaging the low pressure side of said filter medium and having an orifice formed in said wall, means for moving said hollow member over the surface of said filter medium, means for supplying air at a gaseous pressure substantially higher than that existing in said chamber for discharge through said orifice and through said filter medium to dislodge a portion of said layer of solids in a zone opposite said orifice, and a receiver located within said chamber in close proximity with that portion of the high pressure side of said filter medium from which said solids are dislodged, said receiver being open at the bottom whereby the particles dislodged from said filter medium and propelled into said receiver may gravitate within said receiver for discharge from the bottom thereof into the dust-collecting portion of said chamber.

3. A dust filter comprising a chamber having generally vertically disposed walls and a portion near the bottom thereof for collecting dust particles which gravitate to said portion, a porous filter medium suspended within said chamber and forming a generally vertically disposed wall defining a sub-chamber communicating with said chamber only through said porous filter medium, means for directing dust-laden gas to said chamber under gaseous pressure greater than that existing in said sub-chamber to cause said gas to pass through said filter medium and to deposit a layer of the solids forming said dust on the high pressure surface of said filter medium, means for cleaning said filter medium comprising a hollow member having a wall engaging the low pressure side of said filter medium and having an orifice formed in said wall, means for moving said hollow member over the surface of said filter medium, means for supplying air at a gaseous pressure substantially higher than that existing in said chamber for discharge through said orifice and through said filter medium to dislodge a portion of said layer of solids in a zone opposite said orifice, and a receiver mounted in said chamber for movement with said hollow member in close proximity with the high pressure surface of said filter medium, said receiver having an opening generally coextensive with and positioned directly opposite the orifice in said hollow member for receiving the solids dislodged from said filter medium, and said receiver having an opening from which said solids may gravitate into the dust collecting portion of said chamber.

4. A dust filter comprising a chamber having generally vertically disposed walls and a portion near the bottom thereof for collecting dust particles which gravitate to said portion, a porous filter medium suspended within said chamber and forming a generally vertically disposed substantially cylindrical wall defining a sub-chamber communicating with said chamber only through said porous filter medium, means for directing dust-laden gas to said chamber under gaseous pressure greater than that existing in said sub-chamber to cause said gas to pass through said filter medium and to deposit a layer of the solids forming said dust on the high pressure surface of said filter medium, means for cleaning said filter medium comprising a hollow member having a wall engaging the low pressure side of said filter medium and having an orifice formed in said wall, means for moving said hollow member over the surface of said filter medium, means for supplying air at a gaseous pressure substantially higher than that existing in said chamber for discharge through said orifice and through said filter medium to dislodge a portion of said layer of solids in a zone opposite said orifice, and a receiver mounted in said chamber for movement with said hollow member in close proximity with the high pressure surface of said filter medium, said receiver having an opening generally coextensive with and positioned directly opposite the orifice in said hollow member for receiving the solids dislodged from said filter medium, and said receiver having an opening from which said solids may gravitate into the dust collecting portion of said chamber.

5. In a filter for separating particles of solid material from a gas in which said particles are suspended, a flexible filter medium previous to gas and impervious to at least a portion of the solids suspended in said gas, means for supporting said filter medium and holding it in generally cylindrical shape, means for directing said gas and the particles suspended therein to one surface of said filter medium under gaseous pressure greater than that on the other surface of said filter medium to cause said gas to pass through said filter medium and to deposit a layer of said solids on the high-pressure surface thereof, a blow-tube, means for supporting said blow-tube in contact with the low pressure side of said filter medium, said blow-tube having a slot extending lengthwise thereof and opening into contact with said filter medium along a line substantially coinciding with an element of the generally cylindrical body of said filter medium, the gaseous pressure on the high pressure side of said filter medium being effective to press said filter medium into contact with said blow-tube and to cause a bending of said filter medium around said blow-tube elongating the high pressure surface thereof, means for supplying gas under pressure to said blow-tube for discharge through said slot and through said filter medium in the zone of elongation to dislodge a portion of said layer of solids in a zone opposite said slot, means for rotating said blow-tube around the axis of the generally cylindrical body of said filter medium to bring said tube and the slot therein progressively into contact with substantly the entire low pressure surface of said filter medium for cleaning substantially the entire high pressure surface thereof.

6. In a dust filter the combination of a porous flexible filter medium; means on one side of said filter medium for receiving a flow of dust-laden gas at a gaseous pressure greater than that existing on the opposite side of said filter medium whereby the gas may pass through said filter medium and the solid particles of said dust will be detained by said filter medium; a foraminous, relatively rigid support substantially co-extensive in area with said filter medium and supported adjacent said filter medium on the low pressure side thereof; and means for cleaning said filter medium including a blow-tube having an orifice therein, means for supporting said blow-tube in a position between said filter medium and said foraminous support with the orifice thereof in contact with the surface of said filter medium on the low pressure side, means for supplying air to said blow-tube at a pressure substantially greater than that existing on the high pressure side of said filter medium for discharge through said orifice and through said filter medium, and means for causing relative movement between said blow-tube and said filter medium for progressive cleaning of a substantial area of said filter medium.

7. In a dust filter, the combination of a foraminous relatively rigid support, a porous flexible filter medium mounted adjacent said support with one surface thereof adapted to rest against said support, means on the side of said filter medium opposite said support for receiving a flow of dust-laden gas at a gaseous pressure greater than that existing on the other side of said filter medium whereby said filter medium will be pressed against said foraminous support and the gas may pass through said filter medium and the solid particles of said dust will be retained by said filter medium, a blow-tube having an orifice therein, said blow-tube being supported between said foraminous support and said filter medium in such position that the orifice of said blow-tube is disposed for contact with the low pressure side of said filter medium, the gaseous pressure of said dust-laden gas being effective to press the portion of said filter medium displaced from said support by said blow-tube into contact with said blow-tube and thereby to cause a bending of said filter medium around said blow-tube elongating the high pressure surface thereof, means for supplying air to said blow-tube at a pressure substantially greater than that existing on the high pressure side of said filter medium for discharge through said orifice and said filter medium in the zone of elongation, and means for causing relative movement between said blow-tube and said filter medium for progressive cleaning of a substantial area of said filter medium.

8. In a dust filter the combination of a foraminous relatively rigid support of generally cylindrical conformation, a porous flexible filter medium of generally cylindrical conformation mounted in telescoping relation with said support with one surface thereof adapted to rest against said support, means on the side of said filter medium opposite said support for receiving a flow of dust-laden gas at a gaseous pressure greater than that existing on the other side of said filter medium whereby said filter medium will be pressed against said foraminous support and the gas may pass through said filter medium and the solid particles of said dust will be retained by said filter medium, a blow-tube having an elongated slot-like orifice therein, said blow-tube being supported between said foraminous support and said filter medium in such position that the orifice in said blow-tube is disposed for contact with the low pressure side of said filter medium in substantial coincidence with an element of the generally cylindrical body of said filter medium, the gaseous pressure of said dust-laden gas being effective to press the portion of said filter medium displaced from said support by said blow-tube and thereby cause a bending of said filter medium around said blow-tube elongating the high pressure surface thereof, means for supplying air to said blow-tube at a pressure substantially greater than that existing on the high pressure side of said filter medium for discharge through said orifice and said filter medium in the zone of elongation, and means for causing relative movement between said blow tube and said filter medium for progressive cleaning of a substantial area of said filter medium.

9. In a dust filter the combination of a porous flexible filter medium of generally cylindrical conformation; means on the outside of said filter medium for receiving a flow of dust-laden gas at a gaseous pressure greater than that existing on the inside of said filter medium whereby the gas may pass through said filter medium and the solid particles of said dust will be detained by said filter medium; a foraminous, relatively rigid support of generally cylindrical conformation positioned within said filter medium; and means for cleaning said filter medium including a blow-tube having an orifice therein, means for supporting said blow-tube in a position between said filter medium and said foraminous support with the orifice thereof in contact with the surface of said filter medium on the low pressure side, means for supplying air to said blow-tube at a pressure substantially greater than that existing on the high pressure side of said filter medium for discharge through said orifice and through said filter medium, and means for causing relative movement between said blow tube and said filter medium for progressive cleaning of a substantial area of said filter medium.

10. In a dust filter the combination of a porous flexible filter medium of tapering cylindrical conformation; means on the outside of said filter medium for receiving a flow of dust-laden gas at a gaseous pressure greater than that existing on the inside of said filter medium whereby the gas may pass through said filter medium and the solid particles of said dust will be detained by said filter medium; a foraminous, relatively rigid support of tapering cylindrical conformation corresponding with the conformation of said filter medium and supported within said filter medium; means for cleaning said filter medium including a blow-tube having an orifice therein, means for supporting said blow-tube in a position between said filter medium and said foraminous support with the orifice thereof in contact with the surface of said filter medium on the low pressure side, means for supplying air to said blow-tube at a pressure substantially greater than that existing on the high pressure side of said filter medium for emission from said orifice, and means for causing relative movement between said blow-tube and said filter medium for progressive cleaning of a substantial area of said filter medium; and means affording lengthwise adjustment of said filter medium upon said foraminous support to vary the closeness of fit of said filter medium upon said support and blow tube.

11. A dust filter comprising a chamber having generally vertically disposed walls and a portion near the bottom thereof for collecting dust particles which gravitate to said portion; a foraminous relatively rigid support; a porous flexible filter medium suspended within said chamber adjacent said support with one surface thereof adapted to rest against said support and the other surface thereof facing said chamber, said filter medium and said support defining a subchamber communicating with said chamber only through said porous filter medium and said foraminous support, means for directing dust-laden gas to said chamber under gaseous pressure greater than that existing in said sub-chamber whereby said filter medium will be pressed against said foraminous support and the gas may pass through said filter medium and the solid particles of said dust will be retained by said filter medium in the form of a layer of solids on the high pressure surface thereof; and means for cleaning said filter medium comprising a hollow member having an orifice, said hollow member being supported between said foraminous support and said filter medium in such position that the orifice in said hollow member is disposed for contact with the low pressure side of said filter medium, the gaseous pressure of said dust-laden gas being effective to press the portion of said filter medium displaced from said support by said hollow member into contact with said hollow member and thereby to cause a bending of said filter medium around said hollow member, means for moving said hollow member over the surface of said filter medium, means for supplying air at a gaseous pressure substantially higher than that existing in said chamber for discharge through said orifice and through said filter medium to dislodge a portion of said layer of solids in a zone opposite said orifice, and a receiver mounted in said chamber for movement with said hollow member in close proximity with the high pressure surface of said filter medium, said receiver having an opening generally co-extensive with and positioned directly opposite the orifice in said hollow member for receiving the solids dislodged from said filter medium, and said receiver having an opening from which said solids may gravitate into the dust-collecting portion of said chamber.

HENRY J. HERSEY, Jr.

REFERENCES CITED

The following references are of record in the file of this patent:

UNITED STATES PATENTS

| Number | Name | Date |
|---|---|---|
| 996,860 | Kestner | July 4, 1911 |
| 1,498,061 | Adams | June 17, 1924 |
| 1,995,648 | Rathbun | Mar. 26, 1935 |
| 2,364,877 | Smellie | Dec. 12, 1944 |
| 2,474,478 | Hart | June 28, 1949 |

FOREIGN PATENTS

| Number | Country | Date |
|---|---|---|
| 16,392 | Great Britain | May 30, 1912 |
| 554,893 | Germany | July 15, 1932 |